Patented Feb. 16, 1932

1,845,347

UNITED STATES PATENT OFFICE

WINFIELD SCOTT, OF NITRO, WEST VIRGINIA, ASSIGNOR TO THE RUBBER SERVICE LABORATORIES CO., OF AKRON, OHIO, A CORPORATION OF OHIO

AGE RESISTING RUBBER COMPOUND AND PROCESS OF MAKING SAME

No Drawing. Application filed January 24, 1929. Serial No. 334,857.

This invention relates to a process for manufacturing vulcanized rubber products and to the products obtained thereby. It is more particularly directed to a process for vulcanizing rubber wherein there is incorporated into a rubber mix of vulcanization characteristics, a compound of the type hereinafter disclosed whereby anti-oxidant or age resisting properties are developed in the vulcanized rubber product. The invention will be understood from the following description and examples of a preferred mode of operating the process wherein the invention is fully set forth and described.

It is well known in the art to which this invention pertains that the use of certain organic compounds as accelerators of the rubber vulcanization process is materially lessened because of the fact that the presence of such compounds, or of their heat of decomposition or sulfur or other reaction products produced in the rubber curing process, apparently cause or aid in causing a relatively rapid deterioration of the vulcanized products during service. Such rubber products are said to age badly, that is, the rubber becomes hard and loses a large part of its resiliency, while other characteristics such as tensile strength and the like are very detrimentally affected. It has now been found that the deterioration of the vulcanized rubber compound may be substantially decreased and the effective life of the product materially lengthened if there be added to the rubber compound, prior to vulcanization, a small proportion of a hydrocarbon ring-substituted quinoline, said substituted hydrocarbon groups preferably being less than three in number. By the term hydrocarbon ring substituted quinoline as appearing in the present specification is meant a non-polymerized quinoline compound, containing aliphatic or aromatic radicles substituted for hydrogen atoms in the quinoline ring.

The age resisting properties of a vulcanized rubber product can be readily ascertained by subjecting samples of the vulcanized product in a bomb to the action of oxygen under pressure and at an elevated temperature. The aged rubber samples are then examined and tested and the test data compared with the results obtained on testing the unaged rubber samples. The deterioration in properties, effected by the aging tests, is indicative of the result that would normally be expected of that particular stock during actual service. Such a test is known as the Bierer-Davis aging test and produces an effect on a vulcanized rubber stock comparable with that resulting from several years of natural aging of the rubber, depending upon the condition of the test.

One mode of employing the present invention comprises the following, wherein one of the preferred class of compounds, for example, 2,4-dimethyl quinoline having the formula

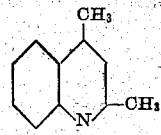

was compounded in the usual manner in a rubber mix of the following composition.

100 parts of pale crepe rubber,
5 parts of zinc oxide,
3.5 parts of sulfur,
0.75 parts of diphenyl-guanidine,
2.0 parts of 2,4-dimethyl quinoline.

The stock was then vulcanized by heating sheets of the stock in the usual manner for 30 and 45 minutes, respectively, at the temperature given by forty pounds of steam pressure per square inch (that is 287° F.). Portions of the stock, curved as set forth, were then artificially aged by heating the same in an oxygen bomb for eighteen hours at a temperature of 80° C. and under an oxygen pressure of 300 pounds per square inch.

The results obtained by testing the aged and unaged stocks follow:

| Time of cure | Hours aged | Modulus of elasticity in lbs./in.² at elongations of— | | | Tensile at break in lbs./in.² | Ultimate elongation |
|---|---|---|---|---|---|---|
| | | 300 % | 500 % | 700 % | | |
| 30 min. at 287° F | 0 | 150 | 412 | 1568 | 2640 | 790 |
| 30 min. at 287° F | 18 | 149 | 428 | 1423 | 2170 | 785 |
| 45 min. at 287° F | 0 | 204 | 622 | 2200 | 3445 | 780 |
| 45 min. at 287° F | 18 | 144 | 489 | | 1255 | 685 |

A rubber stock of the composition employed in the test set forth but containing no anti-oxidant, completely disintegrates and melts to a shapeless mass when subjected to the aging test described.

As seen from the data hereinbefore given, dimethyl quinoline shows marked properties as an anti-oxidant, and further tests show that a rubber stock in which it is incorporated ages far better than a similar rubber stock in which one of the widely used commercial anti-oxidants was incorporated prior to vulcanization.

As another example of the preferred class of compounds, beta naphthoquinoline having the formula

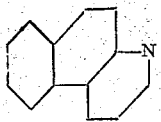

was incorporated in a rubber mix comprising 100 parts of pale crepe rubber,
5 parts of zinc oxide,
3.5 parts of sulfur,
.75 parts of diphenyl-guanidine,
2.0 parts of beta naphthoquinoline.

The above stock was then cured by heating in the usual manner for forty-five minutes at the temperature given by forty pounds of steam pressure per square inch. Portions of the said stock cured as set forth were then artificially aged in the manner previously described for eighteen hours at a temperature of 75° C. and under a pressure of 300 pounds of oxygen. The test data giving a comparison between the aged and unaged stocks follows:

| Time of cure | Hours aged | Modulus of elasticity in lbs./in.² at elongations of— | | | Tensile at break in lbs./in.² | Ultimate elongation |
|---|---|---|---|---|---|---|
| | | 300 % | 500 % | 700 % | | |
| 45 min. at 287° F | 0 | 163 | 576 | 2195 | 3150 | 760 |
| 45 min. at 287° F | 18 | 158 | 480 | 1510 | 1830 | 729 |

As another embodiment of the present invention, polymerized dihydroquinaldine having the following empirical formula $(C_{10}H_{11}N)_3$ was incorporated in a rubber mix in the usual manner comprising 80 parts of pale crepe rubber,
4 parts of zinc oxide,
0.8 parts of diphenyl-guanidine,
1.8 parts of sulfur,
4.0 parts of polymerized dihydroquinaldine.

This stock was then cured in the usual manner for forty and sixty minutes, respectively, at the temperature given by forty pounds of steam pressure per square inch. Portions of this said stock cured as set forth were then artificially aged for eighteen hours at 90° C. and under a pressure of 500 pounds of oxygen per square inch. The test data showing a comparison between the aged and unaged stocks are given in the following table.

| Time of cure | Hours aged | Modulus of elasticity in lbs./in.² at elongations of— | | | Tensile at break in lbs./in.² | Ultimate elongation |
|---|---|---|---|---|---|---|
| | | 300 % | 500 % | 700 % | | |
| 40 min. at 287° F | 0 | 175 | 385 | 1180 | 2505 | 850 |
| 40 min. at 287° F | 18 | 164 | 417 | 1260 | 1670 | 760 |
| 60 min. at 287° F | 0 | 191 | 430 | 1435 | 2795 | 835 |
| 60 min. at 287° F | 18 | 209 | 500 | | 1515 | 690 |

As seen from the above data the rubber in which polymerized dihydroquinaldine was incorporated therein prior to vulcanization shows no great deterioration even when subjected to a pressure of 500 pounds of oxygen per square inch.

Another of the preferred class of compounds, for example, 2-phenyl quinoline having the formula

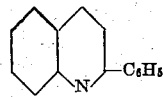

was tested in a rubber stock of vulcanization charcteritsics and found to have anti-oxidant properties.

In all of the examples hereinbefore cited, diphenyl-guanidine was used as an accelerator because it is known to produce a vulcanized rubber stock that has very poor aging qualities. Other accelerators could, of course, be employed and would produce a stock possessing different tensile strength from those set forth.

The various examples hereinbefore set forth in detail are to be understood as illustrative only and not at all limitative of the scope of the invention. Other compounding ingredients and other proportions of ingredients than those set forth in the various examples may be employed in the manufacture of vulcanized rubber products as is well known to those skilled in the art to which the invention pertains. The present invention is limited solely by the claims attached hereto as a part of this specification.

What is claimed is:

1. The process of manufacturing a vulcanized rubber product possessing age resisting characteristics which comprises incorporating with rubber, sulfur and a vulcanization accelerator prior to vulcanization a non-polymerized hydrocarbon ring-substituted quinoline, said substituted hydrocarbon groups being less than three in number.

2. The process of manufacturing a vulcanized rubber product possessing age resisting characteristics which comprises incorporating with said product, prior to vulcanization, a quinoline in which two hydrogen atoms in the ring are substituted with hydrocarbon groups.

3. The process of manufacturing a vulcanized rubber product possessing age resisting characteristics which comprises incorporating 2,4-dimethyl quinoline with said product prior to vulcanization.

4. An age resisting rubber product comprising the vulcanization product of a rubber stock containing prior to the vulcanization rubber, sulfur, a vulcanization accelerator and a non-polymerized hydrocarbon ring-substituted quinoline, said substituted hydrocarbon groups being less than three in number.

5. An age resisting rubber product comprising the vulcanization product of a rubber stock containing prior to the vulcanization of said stock a quinoline in which two hydrogen atoms in the ring are substituted with hydrocarbon groups.

6. An age resisting rubber product comprising the vulcanization product of a rubber stock containing 2,4-dimethyl quinoline prior to the vulcanization of said stock.

7. The process of manufacturing a vulcanized rubber product possessing age resisting characteristics which comprises incorporating with said product prior to vulcanization a quinoline in which two hydrogen atoms in the ring are substituted with methyl groups.

8. An age resisting rubber product comprising the vulcanization product of a rubber stock containing prior to the vulcanization of said stock a quinoline in which two hydrogen atoms in the ring are substituted with methyl groups.

9. The process of manufacturing a vulcanized rubber product possessing age resisting characteristics which comprises incorporating with rubber, sulfur and a vulcanization accelerator prior to vulcanization a quinoline in which less than three hydrogen atoms in the ring are substituted with methyl groups.

10. An age resisting rubber product comprising the vulcanization product of a rubber stock containing prior to the vulcanization rubber, sulfur, a vulcanization accelerator and a quinoline in which less than three hydrogen atoms in the ring are substituted with methyl groups.

11. A process of manufacturing a vulcanized rubber product possessing age resisting characteristics which comprises incorporating with said product prior to vulcanization a member of a group of compounds consisting of dimethyl quinoline, naphthoquinoline and 2-phenyl quinoline.

12. An age resisting rubber product comprising the vulcanization product of a rubber stock containing prior to the vulcanization of said stock a member of a group of compounds consisting of dimethyl quinoline, naphthoquinoline and 2-phenyl quinoline.

In testimony whereof I hereunto affix my signature.

WINFIELD SCOTT.